C. HORSTER.
RESILIENT WHEEL.
APPLICATION FILED AUG. 23, 1917.

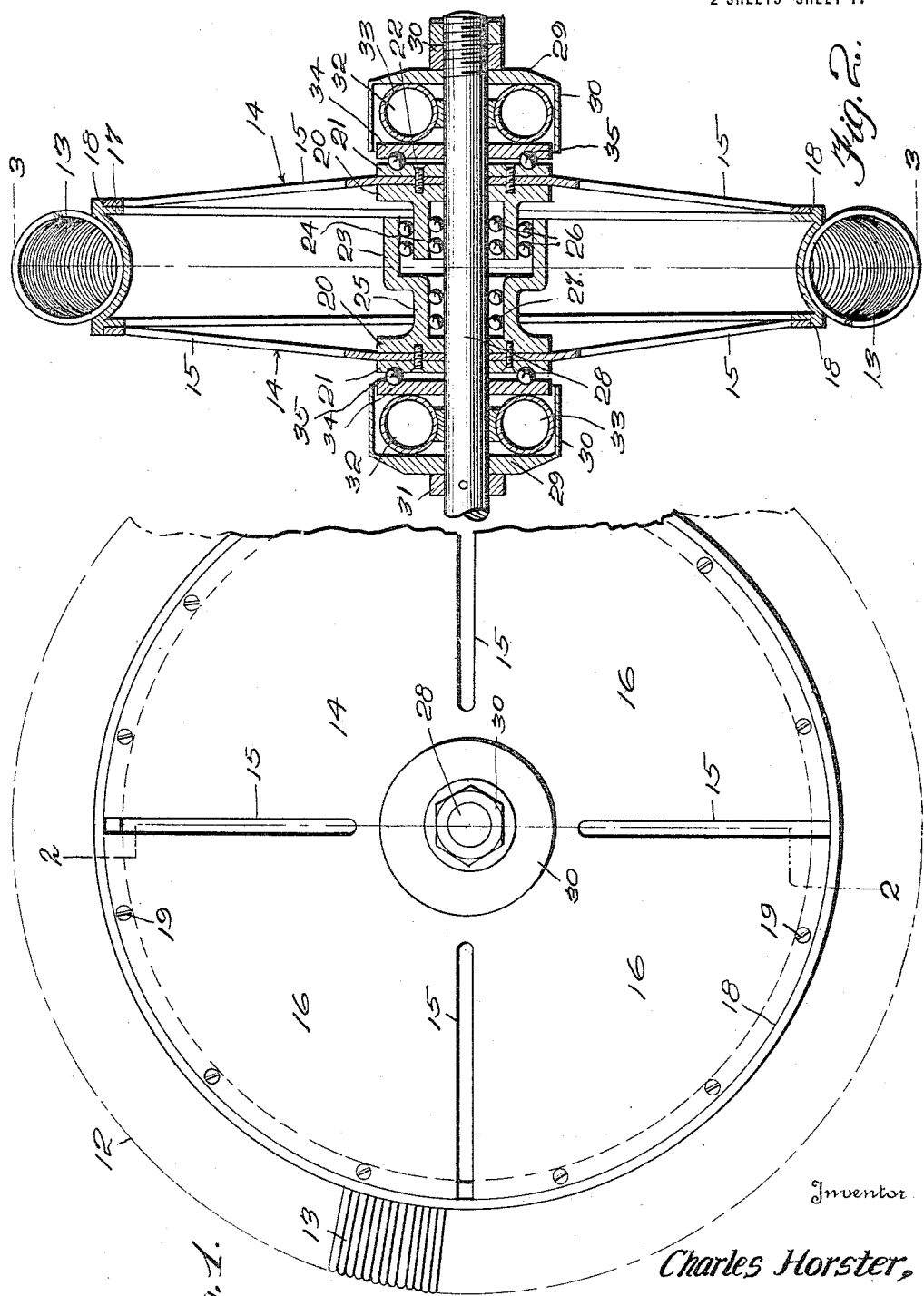

1,265,660.

Patented May 7, 1918.
2 SHEETS—SHEET 2.

Inventor
Charles Horster,
By C. L. Parker.
Attorney

UNITED STATES PATENT OFFICE.

CHARLES HORSTER, OF HAILEYBURY, ONTARIO, CANADA, ASSIGNOR OF ONE-HALF TO MICHAEL MADORSKI, OF GOW-GAUDA, ONTARIO, CANADA.

RESILIENT WHEEL.

1,265,660.   Specification of Letters Patent.   Patented May 7, 1918.

Application filed August 23, 1917. Serial No. 187,778.

*To all whom it may concern:*

Be it known that I, CHARLES HORSTER, a subject of the Emperor of Germany, residing at Haileybury, Province of Ontario, Canada, have invented certain new and useful Improvements in Resilient Wheels, of which the following is a specification.

My invention relates to improvements in resilient wheels, and has particular reference to such a wheel wherein the cushioning means is carried in or upon the hub.

An important object of the invention is to provide a wheel of the above mentioned character, which is strong, durable, and highly efficient in operation.

A further object of the invention is to provide a wheel of the above mentioned character, the elements of which are arranged in a highly compact manner and are substantially covered for the exclusion of dust or the like.

A further object of the invention is to provide a wheel of the above mentioned character, which is attractive in appearance.

Other objects and advantages of the invention will be apparent during the course of the following description.

Figure 3:
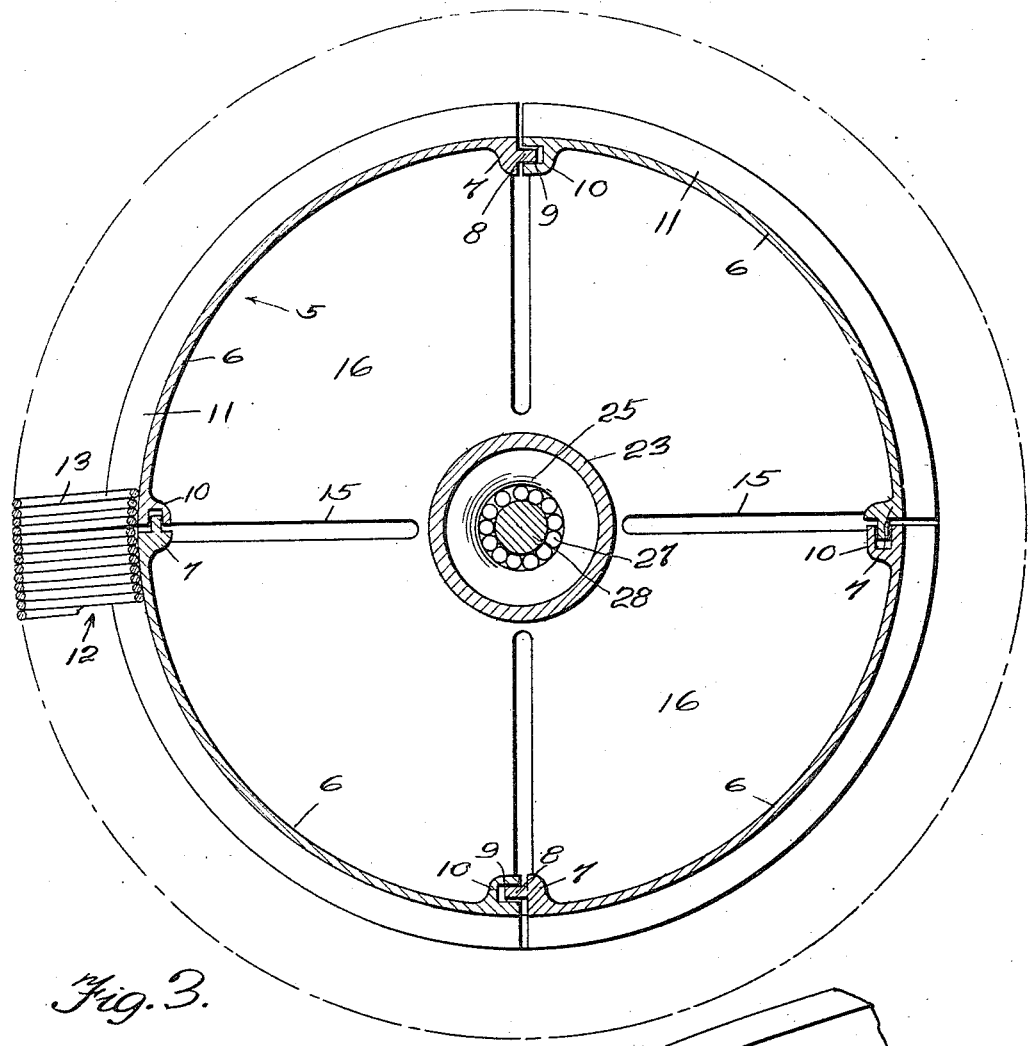
Figure 4:
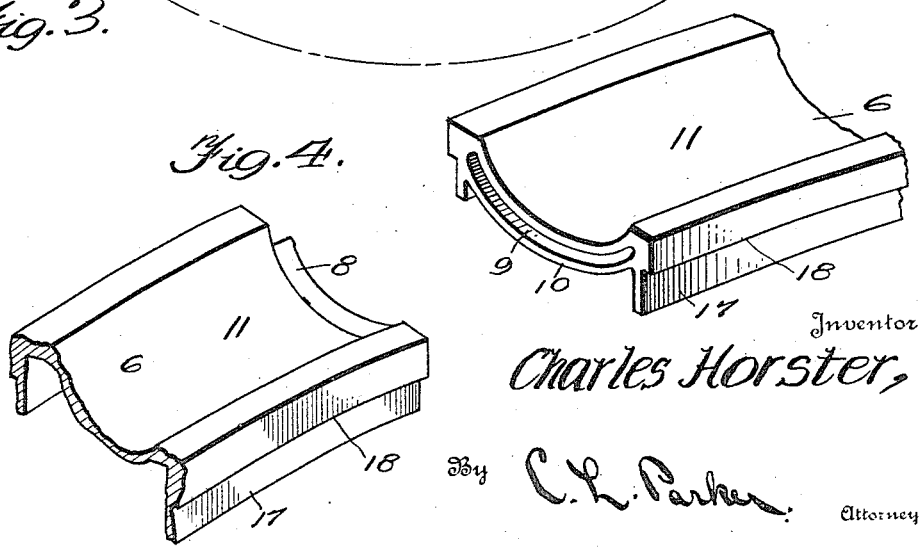

In the accompanying drawings forming a part of this specification and in which like numerals are employed to designate like parts throughout the same, Figure 1 is a side elevation of a wheel embodying my invention, parts being broken away, Fig. 2 is a transverse sectional view through the same, taken on line 2—2 of Fig. 1, Fig. 3 is a sectional view taken on line 3—3 of Fig. 2, and, Fig. 4 is a perspective view of the co-acting ends of rim sections.

In the drawings, wherein for the purpose of illustration is shown a preferred embodiment of my invention, the numeral 5 designates a rim as a whole, which is divided into a plurality of rim-sections 6, there being four of these rim-sections shown, for the purpose of illustration. Corresponding ends of the rim-sections 6 are provided with inwardly extending lugs 7, having transverse longitudinally curved tongues 8, fitting within grooves 9 of sockets 10, formed upon corresponding opposite ends of the rim-sections. As clearly shown in Fig. 4, each groove 9 is closed at its ends, whereby the tongue 8 may reciprocate therein but cannot move transversely of the same. It is thus apparent that the rim 5 is circumferentially contractible and expansible within certain limits. The rim-sections 6 are preferably curved in cross-section and are provided with grooved or channeled faces 11, for the reception of a tire 12.

This tire 12 is preferably formed of a closely woven coil spring 13, which may or may not be inclosed within a tire casing. While I prefer to use this form of tire in connection with my improved wheel, it is to be understood that the invention is in no sense restricted to such use.

Arranged upon opposite sides of the rim 5 are resilient metallic plates or disks 14. Each resilient plate or disk 14 is provided with a plurality of radial slots or openings 15, preferably four in number, corresponding in number and arrangement to the joints' of the rim-sections 6. The slots or openings 15 divide the plate or disk 14 into segments 16, as shown. The segments 16 are arranged in contact with flanges 17, of the rim-sections, and engage within and beneath shoulders 18. The segments 16 are secured to the flanges 17 by screws 19 or the like, and these segments by contacting with the shoulders 18, take the strain off of the screws 19.

The central portions of the plates or disks 14 are arranged in contact with hub sections 20, and secured thereto by plates 21, which may be attached to the hub sections by screws 22 or the like. The outer hub section 20 is provided with an inwardly extending annular flange 24, telescoping an annular flange 23, carried by a ring 25, formed upon the inner hub section 20. Arranged between the flanges 23 and 24 are balls 26, and balls 27 are disposed between the ring 25 and an axle section or spindle 28, as shown. The hub sections 20 are rotatable and axially or longitudinally movably mounted upon the spindle 28, which may be the front axle spindle. When the wheel is carried by the rear axle spindle the hub sections 20 will be splined thereto so that they are free to move axially or longitudinally of the spindle but cannot rotate with respect thereto.

Disposed upon the outer sides of the hub sections 20 are heads 29 of caps 30. These heads cannot move longitudinally of the spindle 28, as they contact with stop elements or nuts 30 and 31, rigidly secured to the spindle. Arranged within the caps 30 are cushion members 32, preferably in the form of inflated tubes or tires 33, contacting with the heads 29. The inner sides of the tubes or tires 33 contact with annular plates 34, which are loosely carried by the spindle 28. The plates 34 receive balls 35 between them and the plates 21, as shown.

In operation, when the wheel or a portion thereof is subjected to excessive strain or pressure, the corresponding rim-section 6 will move inwardly slightly, causing the plates or disks 14 to yield, the central portions of these plates traveling away from each other longitudinally of the spindle 28. This movement of the plates is yieldingly opposed by the tubes or tires 33.

It is to be understood that the form of my invention herewith shown and described is to be taken as a preferred example of the same, and that various changes in the shape, size, and arrangement of parts may be resorted to without departing from the spirit of the invention or the scope of the subjoined claims.

Having thus described my invention, I claim:

1. In a wheel of the character described, a circumferentially contractible and expansible rim, including a plurality of sections, each section being provided at its opposite edges with radially disposed flanges, said flanges being provided near their outer edges with shoulders; a plurality of resilient disks arranged upon the opposite sides of the rim, each disk being provided with radially extending slits which extend through the outer edge thereof and terminate at points near and spaced from the central portion of the disk for providing a solid hub portion, said slits providing a plurality of segmental members corresponding in number and arrangement to the sections of the rim; means for connecting the segmental members with the outer sides of the flanges of the rim to engage beneath the shoulders thereof; a plurality of hub sections secured to the solid hub portions of the disks and mounted for longitudinal movement toward and away from each other; and yielding means to oppose the longitudinal movement of the hub sections away from each other.

2. In a wheel of the character described, a circumferentially contractible and expansible rim, including a plurality of sections, each section being provided at its opposite edges with radially disposed flanges, said flanges being provided near their outer edges with shoulders; a plurality of resilient disks arranged upon the opposite sides of the rim, each disk being provided with radially extending slits which extend through the outer edge thereof and terminate at points near and spaced from the central portion of the disk for providing a solid hub portion, said slits providing a plurality of segmental members corresponding in number and arrangement to the sections of the rim; means for connecting the segmental members with the outer sides of the flanges of the rim to engage beneath the shoulders thereof; a plurality of hub sections connected with the hub portions of the disks; a spindle upon which the hub sections are mounted to move longitudinally; stops carried by the spindle and arranged outwardly of and near the outer ends of the hub sections; and yielding means arranged between the stops and the hub sections.

3. In a wheel of the character described, a plurality of rim sections arranged in end to end relation, the corresponding ends of the rim sections being provided with inwardly projecting transverse lugs carrying transverse tongues, the corresponding opposite ends of the rim sections being provided with inwardly extending transverse lugs provided with transverse grooves for the reception of the transverse tongues, a plurality of resilient disks arranged upon opposite sides of the rim sections and secured thereto, said disks being provided with radially extending slots which pass through the outer edge thereof and extend inwardly to terminate at points disposed near and spaced from the central portions of the disks providing central hub portions, hub sections secured to the solid hub portions of the disks and movable longitudinally toward and away from each other, and yielding means to oppose the longitudinal movements of the hub sections away from each other.

In testimony whereof I affix my signature in presence of two witnesses.

CHARLES HORSTER.

Witnesses:
Z. E. LAFONTAINE,
ROSALIE HORSTER.